US012682226B2

(12) United States Patent (10) Patent No.: US 12,682,226 B2

Kamenetskaya et al. (45) Date of Patent: Jul. 14, 2026

(54) METHOD AND APPARATUS FOR UTILIZING EXTERNAL NEURAL PROCESSOR FROM GRAPHICS PROCESSOR

(71) Applicant: QUALCOMM Incorporated, San Diego, CA (US)

(72) Inventors: Elina Kamenetskaya, Belmont, MA (US); Amir Momeni, Arlington, MA (US); Hamza Omar, San Diego, CA (US); Engin Ipek, San Diego, CA (US); Alexei Vladimirovich Bourd, San Diego, CA (US); Zifeng Li, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 662 days.

(21) Appl. No.: 18/298,029

(22) Filed: Apr. 10, 2023

(65) Prior Publication Data

US 2024/0338555 A1    Oct. 10, 2024

(51) Int. Cl.
*G06N 3/063* (2023.01)
(52) U.S. Cl.
CPC .................................... *G06N 3/063* (2013.01)
(58) Field of Classification Search
CPC .. G06F 2209/509; G06F 9/5088; G06N 3/063
See application file for complete search history.

(56) References Cited

U.S. PATENT DOCUMENTS

2020/0104691 A1* 4/2020 Bai ......................... G06F 13/28
2021/0089301 A1* 3/2021 Maiyuran ............... G06F 17/16
2023/0016455 A1* 1/2023 Palla ........................ G06N 3/08

OTHER PUBLICATIONS

International Search Report and Written Opinion—PCT/US2024/019588—ISA/EPO—Jun. 10, 2024.

* cited by examiner

*Primary Examiner* — Brent Johnston Hoover
(74) *Attorney, Agent, or Firm* — Loza & Loza LLP

(57) ABSTRACT

Aspects of the disclosure are directed to concurrent tensor processing with multiple processing engines. In accordance with one aspect, an apparatus including a common memory unit; a first processing engine coupled to the common memory unit, wherein the first processing engine is configured to access a portion of an input tensor and a portion of a kernel tensor from the common memory unit; and a second processing engine coupled to the common memory unit, wherein the first processing engine is further configured to send the portion of the input tensor and the portion of the kernel tensor to the second processing engine and wherein the second processing engine is configured to generate a portion of an output tensor based on the portion of the input tensor and on the portion of the kernel tensor.

26 Claims, 8 Drawing Sheets

FIG 8.

810
a first portion of an input tensor is accessed from a common memory unit 820
a first portion of a kernel tensor is accessed from the common memory unit 830
the first portion of the input tensor is sent to a neural processing unit (NPU)

840
the first portion of the kernel tensor is sent to the NPU 850
a synchronization request message is sent to the NPU 860
a synchronization response message is received from the NPU 870
a first portion of an output tensor is retrieved from the common memory unit, wherein the first portion of the output tensor is generated by the NPU based on the first portion of the input tensor and on the first portion of the kernel tensor

METHOD AND APPARATUS FOR UTILIZING EXTERNAL NEURAL PROCESSOR FROM GRAPHICS PROCESSOR

TECHNICAL FIELD

This disclosure relates generally to the field of information processing, and, in particular, to concurrent tensor processing with multiple processing engines.

BACKGROUND

A modern trend in information processing systems is the utilization of multiple processing engines, processors or processing cores with higher performance for increasingly demanding user applications. Many current information processing systems include a central processing unit (CPU), a digital signal processor (DSP), an image signal processor (ISP), etc., along with input/output interfaces, a hierarchy of memory units and associated interconnection databuses. In many applications, the information processing system is assigned to work on a plurality of work tasks which are executed on a plurality of processing engines. For some use cases or scenarios, performance may be compromised by inefficient usage of parallel processing among the plurality of processing engines. For such information processing systems, improved performance may be attained by efficient concurrent tensor processing with multiple processing engines and a common memory.

SUMMARY

The following presents a simplified summary of one or more aspects of the present disclosure, in order to provide a basic understanding of such aspects. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in a simplified form as a prelude to the more detailed description that is presented later.

In one aspect, the disclosure provides concurrent tensor processing with multiple processing engines. Accordingly, an apparatus including a common memory unit; a first processing engine coupled to the common memory unit, wherein the first processing engine is configured to access a portion of an input tensor and a portion of a kernel tensor from the common memory unit; and a second processing engine coupled to the common memory unit, wherein the first processing engine is further configured to send the portion of the input tensor and the portion of the kernel tensor to the second processing engine and wherein the second processing engine is configured to generate a portion of an output tensor based on the portion of the input tensor and on the portion of the kernel tensor.

In one example, the second processing engine is further configured to be accessed directly by the first processing engine to support a workload or a wave-level execution structure from the first processing engine. In one example, the workload is a sum of all work tasks of the first processing engine.

In one example, the wave-level execution structure is a data structure which operates on the portion of the input tensor. In one example, the wave-level execution structure is a data structure which operates on the portion of the kernel tensor. In one example, the wave-level execution structure is the data structure which operates on the portion of the input tensor. In one example, the second processing engine is further configured to execute one or more heterogeneous operations on the portion of the input tensor and the portion of the kernel tensor.

In one example, the one or more heterogeneous operations include matrix multiplication instructions received from the first processing engine. In one example, the one or more heterogeneous operations include convolution instructions received from the first processing engine. In one example, the one or more heterogeneous operations uses parallel tensor processing. In one example, the one or more heterogeneous operations uses at least one wave-level parallel operation.

In one example, the portion of the input tensor includes a plurality of input fibers. In one example, the portion of the kernel tensor includes a plurality of kernel fibers. In one example, the at least one wave-level parallel operation executes on the plurality of input fibers and the plurality of kernel fibers in parallel. In one example, the portion of the input tensor includes an input wave. In one example, the portion of the kernel tensor includes a kernel wave. In one example, the at least one wave-level parallel operation executes on the input wave and the kernel wave in parallel.

Another aspect of the disclosure provides a method for implementing concurrent tensor processing, the method including accessing a portion of an input tensor from a common memory unit; accessing a portion of a kernel tensor from the common memory unit; sending the portion of the input tensor to a neural processing unit (NPU); sending the portion of the kernel tensor to the NPU; and retrieving a portion of an output tensor from the common memory unit, wherein the portion of the output tensor is generated by the NPU based on the portion of the input tensor and on the portion of the kernel tensor.

In one example, the method further includes sending a synchronization request message to the NPU. In one example, the synchronization request message is based on a polling synchronization scheme or on a hardware interrupt synchronization scheme. In one example, the method further includes receiving a synchronization response message from the NPU. In one example, the synchronization response message is based on a polling synchronization scheme or on a hardware interrupt synchronization scheme.

In one example, the method further includes configuring the NPU to be accessed directly by a processing engine to support a workload or a wave-level execution structure from the processing engine. In one example, the portion of the input tensor includes a plurality of input fibers and the portion of the kernel tensor includes a plurality of kernel fibers. In one example, the portion of the input tensor includes a plurality of input waves and the portion of the kernel tensor includes a plurality of kernel waves.

Another aspect of the disclosure provides an apparatus for implementing concurrent tensor processing, the apparatus including means for accessing a portion of an input tensor from a common memory unit; means for accessing a portion of a kernel tensor from the common memory unit; means for sending the portion of the input tensor to a neural processing unit (NPU); means for sending the portion of the kernel tensor to the NPU; and means for retrieving a portion of an output tensor from the common memory unit, wherein the portion of the output tensor is generated by the NPU based on the portion of the input tensor and on the portion of the kernel tensor.

In one example, the apparatus further includes means for configuring the NPU to be accessed directly by a processing engine to support a workload or a wave-level execution structure from the processing engine. In one example, the portion of the input tensor includes a plurality of input fibers and the portion of the kernel tensor includes a plurality of kernel fibers.

Another aspect of the disclosure provides a non-transitory computer-readable medium storing computer executable code, operable on a device including at least one processor and at least one memory coupled to the at least one processor, wherein the at least one processor is configured to implement concurrent tensor processing, the computer executable code including instructions for causing a computer to access a portion of an input tensor from a common memory unit; instructions for causing the computer to access a portion of a kernel tensor from the common memory unit; instructions for causing the computer to send the portion of the input tensor to a neural processing unit (NPU); instructions for causing the computer to send the portion of the kernel tensor to the NPU; and instructions for causing the computer to retrieve a portion of an output tensor from the common memory unit, wherein the portion of the output tensor is generated by the NPU based on the portion of the input tensor and on the portion of the kernel tensor. In one example, the non-transitory computer-readable medium further includes instructions for causing the computer to configure the NPU to be accessed directly by a processing engine to support a workload or a wave-level execution structure from the processing engine.

These and other aspects of the present disclosure will become more fully understood upon a review of the detailed description, which follows. Other aspects, features, and implementations of the present disclosure will become apparent to those of ordinary skill in the art, upon reviewing the following description of specific, exemplary implementations of the present invention in conjunction with the accompanying figures. While features of the present invention may be discussed relative to certain implementations and figures below, all implementations of the present invention can include one or more of the advantageous features discussed herein. In other words, while one or more implementations may be discussed as having certain advantageous features, one or more of such features may also be used in accordance with the various implementations of the invention discussed herein. In similar fashion, while exemplary implementations may be discussed below as device, system, or method implementations it should be understood that such exemplary implementations can be implemented in various devices, systems, and methods.

BRIEF DESCRIPTION OF THE DRAWINGS

FIG. 8 illustrates an example flow diagram for executing concurrent tensor processing.

DETAILED DESCRIPTION

Figure 1:
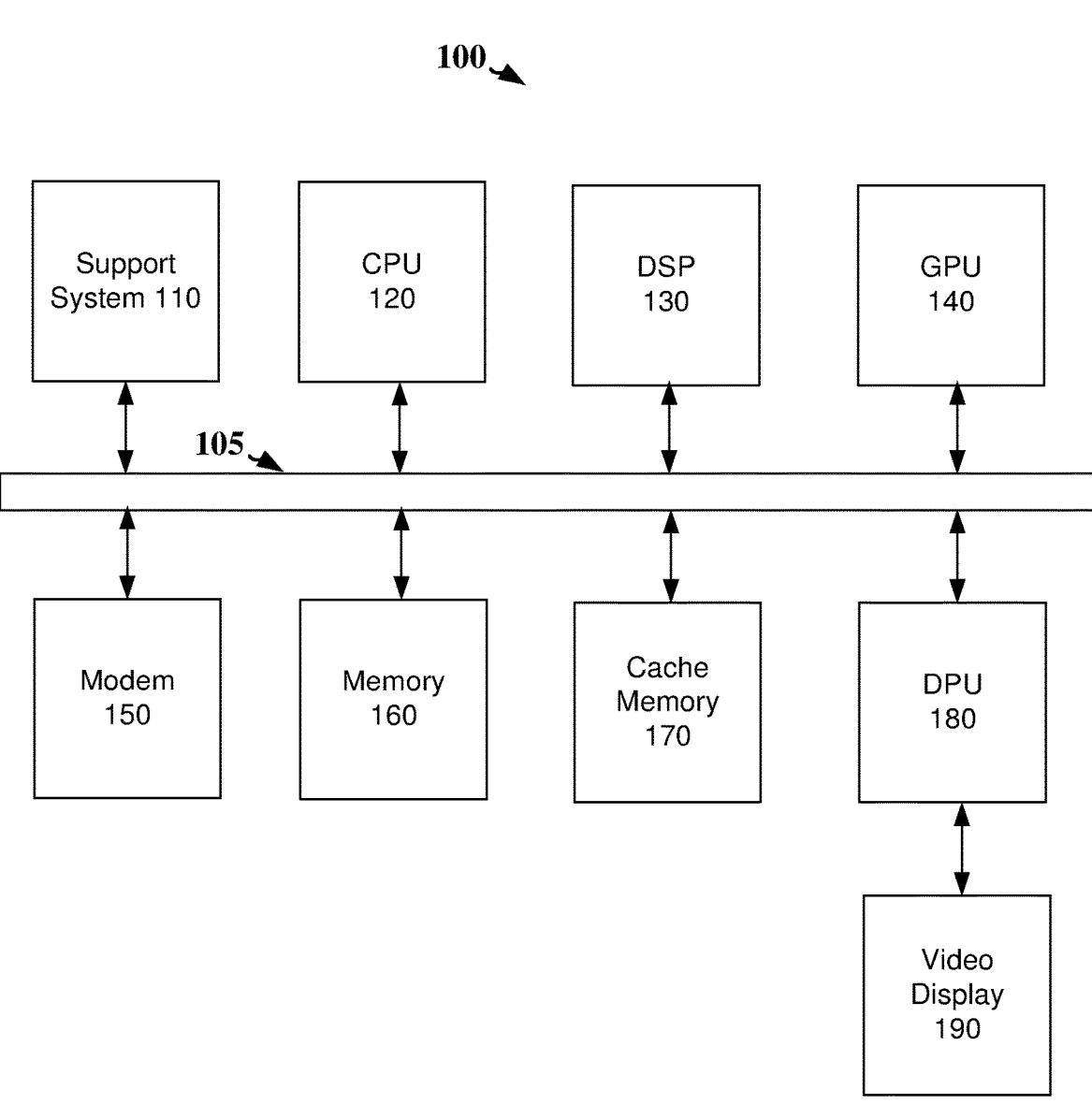
FIG. 1 illustrates an example of an information processing system.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

While for purposes of simplicity of explanation, the methodologies are shown and described as a series of acts, it is to be understood and appreciated that the methodologies are not limited by the order of acts, as some acts may, in accordance with one or more aspects, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with one or more aspects.

An information processing system, for example, a computing system with multiple slices (e.g., processing engines) or a system on a chip (SoC), may require multiple levels of coordination or synchronization. In one example, a slice includes a processing engine (i.e., a subset of the computing system) as well as associated memory units and other peripheral units. In one example, execution of an application may be decomposed into a plurality of work tasks which are executed by multiple slices or multiple processing engines.

In one example, the associated memory units of the information processing system may form a memory hierarchy with a local memory unit or an internal cache memory unit dedicated to each slice, a global memory unit shared among all slices and other memory units with various degrees of shared access. For example, a first level cache memory or L1 cache memory may be a memory unit dedicated to a single processing engine and may be optimized with a faster memory access time at the expense of storage space. For example, a second level cache memory or L2 cache memory may be a memory unit which is shared among more than one processing engine and may be optimized to provide a larger storage space at the expense of memory access time. In one example, each slice or each processing engine includes a dedicated internal cache memory.

In one example, the memory hierarchy may be organized as a cascade of cache memory units with the first level cache memory, the second level cache memory and other memory units with increasing storage space and slower memory access time going up the memory hierarchy. In one example, other cache memory units in the memory hierarchy may be introduced which are intermediate between existing memory units. For example, an L1.5 cache memory, which is intermediate between the L1 cache memory and the L2 cache memory, may be introduced in the memory hierarchy of the information processing system.

FIG. 1 illustrates an example of an information processing system 100. In one example, the information processing system 100 includes a plurality of processing engines such as a central processing unit (CPU) 120, a digital signal processor (DSP) 130, a graphics processing unit (GPU) 140, a display processing unit (DPU) 180, etc. In one example, various other functions in the information processing system 100 may be included such as a support system 110, a modem 150, a memory 160, a cache memory 170 and a video display 190. For example, the plurality of processing engines and various other functions may be interconnected by an interconnection databus 105 to transport data and control information. For example, the memory 160 and/or the cache memory 170 may be shared among the CPU 120, the GPU 140 and the other processing engines. In one example, the CPU 120 may include a first internal memory which is not shared with the other processing engines. In one example, the GPU 140 may include a second internal memory which is not shared with the other processing engines. In one example, any processing engine of the plurality of processing engines may have an internal memory which is not shared with the other processing engines.

In one example, certain information processing applications involve manipulation or processing of a tensor, i.e., tensor processing. In one example, a tensor is an array of tensor elements with a plurality of dimensions. In one example, the array of tensor elements is an array of numerical values. In one example, the plurality of dimensions of the tensor determines a tensor type or an order of the tensor. For example, a tensor with one dimension is a first order tensor or a vector, a tensor with two dimensions is a second order tensor or a matrix, a tensor with three dimensions is a third order tensor, etc. For example, a tensor with zero dimensions is a zeroth order tensor or a scalar. In one example, the order of the tensor is equal to a quantity of dimensions of the tensor.

In one example, instead of processing the tensor in its entirety, one may process various subsets of the tensor separately, either sequentially or in parallel. In one example, a tensor element (e.g., of a third order tensor) may be denoted as $x_{ijk}$, where i is an index for a first dimension of the tensor, j is an index for a second dimension of the tensor, and k is an index for a third dimension of the tensor. In one example, a fiber is a first subset of the tensor with all indices but one fixed. That is, if there are N indices, N−1 are fixed.

In one example, the fiber may be a subset of the tensor with tensor elements $\{x_{ijk}\}$ where indices j and k are fixed but index i is variable. That is, if there are N indices, N−2 or less are fixed. In one example, a wave is a second subset of the tensor with tensor elements $\{x_{ijk}\}$ where two or more indices are variable. That is, the wave may be considered as a group of fibers. In one example, a wave-level execution structure is a data structure which operates on a wave.

Figure 2:
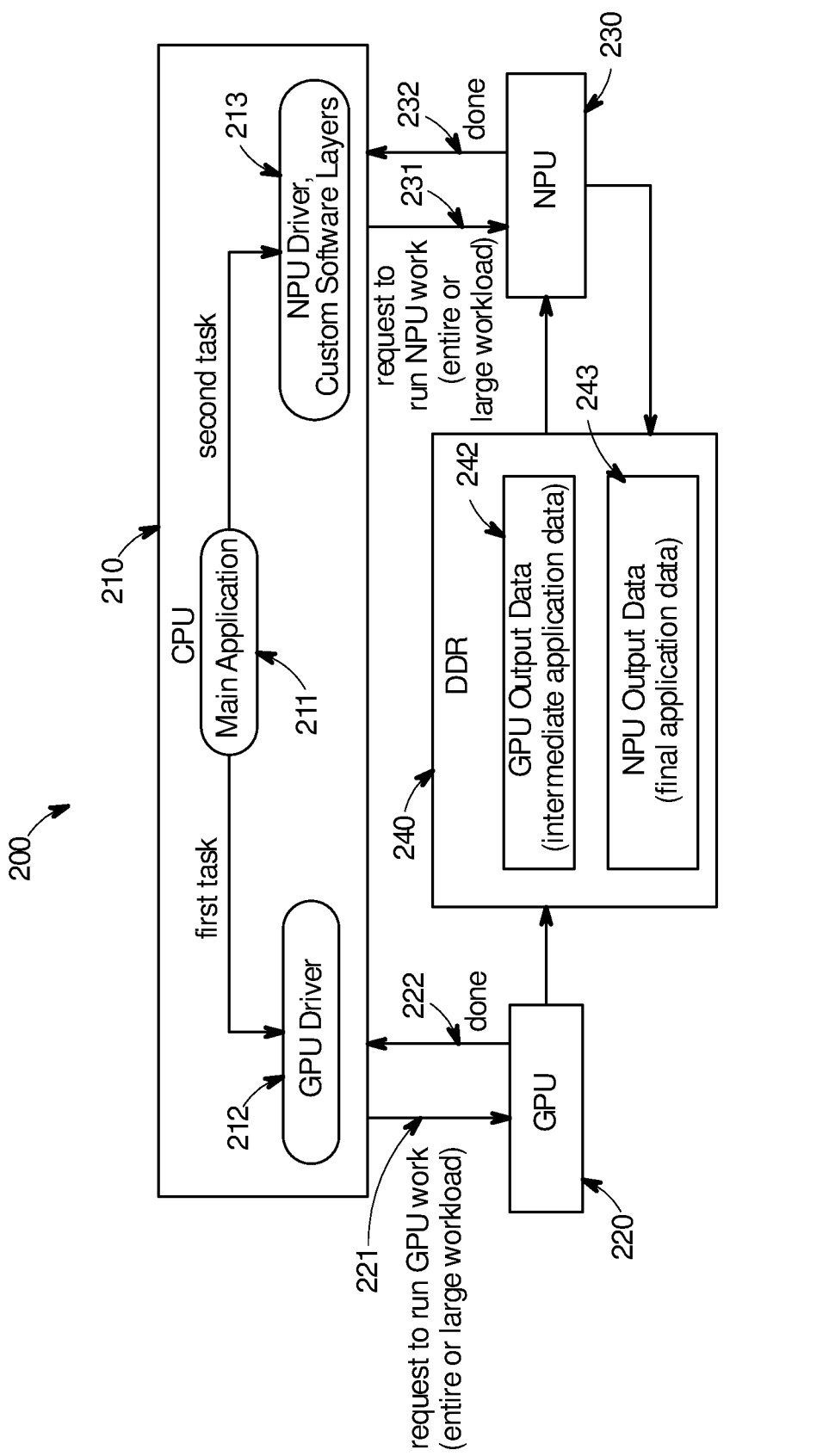
FIG. 2 illustrates an example of a non-concurrent tensor processing system with a plurality of processing engines and a common memory unit.

FIG. 2 illustrates an example of a non-concurrent tensor processing system 200 with a plurality of processing engines and a common memory unit. In one example, the non-concurrent tensor processing system 200 includes a central processing unit (CPU) 210, a graphics processing unit (GPU) 220, a neural processing unit (NPU) 230 and a common memory unit 240. In one example, the common memory unit 240 is a double data rate (DDR) memory, i.e., a memory unit which operates twice (e.g., rising edge and falling edge) per memory clock cycle.

In one example, the CPU 210 includes a plurality of software modules for executing a plurality of work tasks and functions. In one example, the CPU 210 may also assign certain work tasks and functions to other processing engines. For example, the CPU 210 may assign GPU work tasks to the GPU 220 and NPU work tasks to the NPU 230. In one example, the plurality of software modules may include a main application module 211, a GPU driver 212, a NPU driver 213, etc. For example, the NPU driver 213 may also include custom software layers for specialized tasks. In one example, a driver is a software module used to facilitate data and control exchange between two processors (e.g., between the CPU 210 and GPU 220 or between the CPU 210 and NPU 230).

In one example, the common memory unit 240 (e.g., DDR memory) may be accessed by GPU 220 and NPU 230. In one example, the common memory unit 240 stores GPU output data 242. In one example, the GPU output data 242 may be intermediate application data. In one example, the common memory unit 240 stores NPU output data 243. In one example, the NPU output data 243 may be final application data.

In one example, the non-concurrent tensor processing system 200 may operate by sending coordination messages among the plurality of processing engines. In one example, the CPU 210 may send a GPU work request message 221 to the GPU 220. For example, the GPU work request message 221 may direct the GPU 220 to initiate GPU work tasks. For example, upon completion of GPU work tasks by the GPU 220, the GPU 220 may send a GPU work complete message 222 to the CPU 210. In one example, the GPU work tasks may be an entire workload. In one example, an entire workload is a sum of all work tasks.

In one example, the CPU 210 may send a NPU work request message 231 to the NPU 230. For example, the NPU work request message 231 may direct the NPU 230 to initiate NPU work tasks. For example, upon completion of NPU work tasks by the NPU 230, the NPU 230 may send a NPU work complete message 232 to the CPU 210. In one example, the NPU work tasks may be an entire workload.

In one example, the GPU 220 may be optimized for numerous computationally intensive work tasks in the non-concurrent tensor processing system 200. In one example, the NPU 230 may be optimized for certain computationally intensive work tasks in the non-concurrent tensor processing system 200 such as matrix multiplication, convolution, correlation, etc.

In one example, the NPU 230 of FIG. 2 may have no direct interface with the GPU 220. For example, custom software layers may be used to execute large convolutional neural networks efficiently. In one example, heterogeneous applications which leverage both the GPU 220 and NPU 230 for computational work tasks may communicate with each other through the common memory unit 240. For example, the GPU 220 and NPU 230 work collaboration may only be practical at large workload boundaries. In one example, an entire application, or a large part of the entire application must be executed on the GPU 220 first and then on the NPU 230 second. That is, in many scenarios, the GPU 220 and NPU 230 may operate sequentially (i.e., non-concurrently), rather than in parallel (i.e., concurrently). In one example, large workload boundaries occur when coordination overhead between processors is a small fraction of the overall workload.

Figure 3:
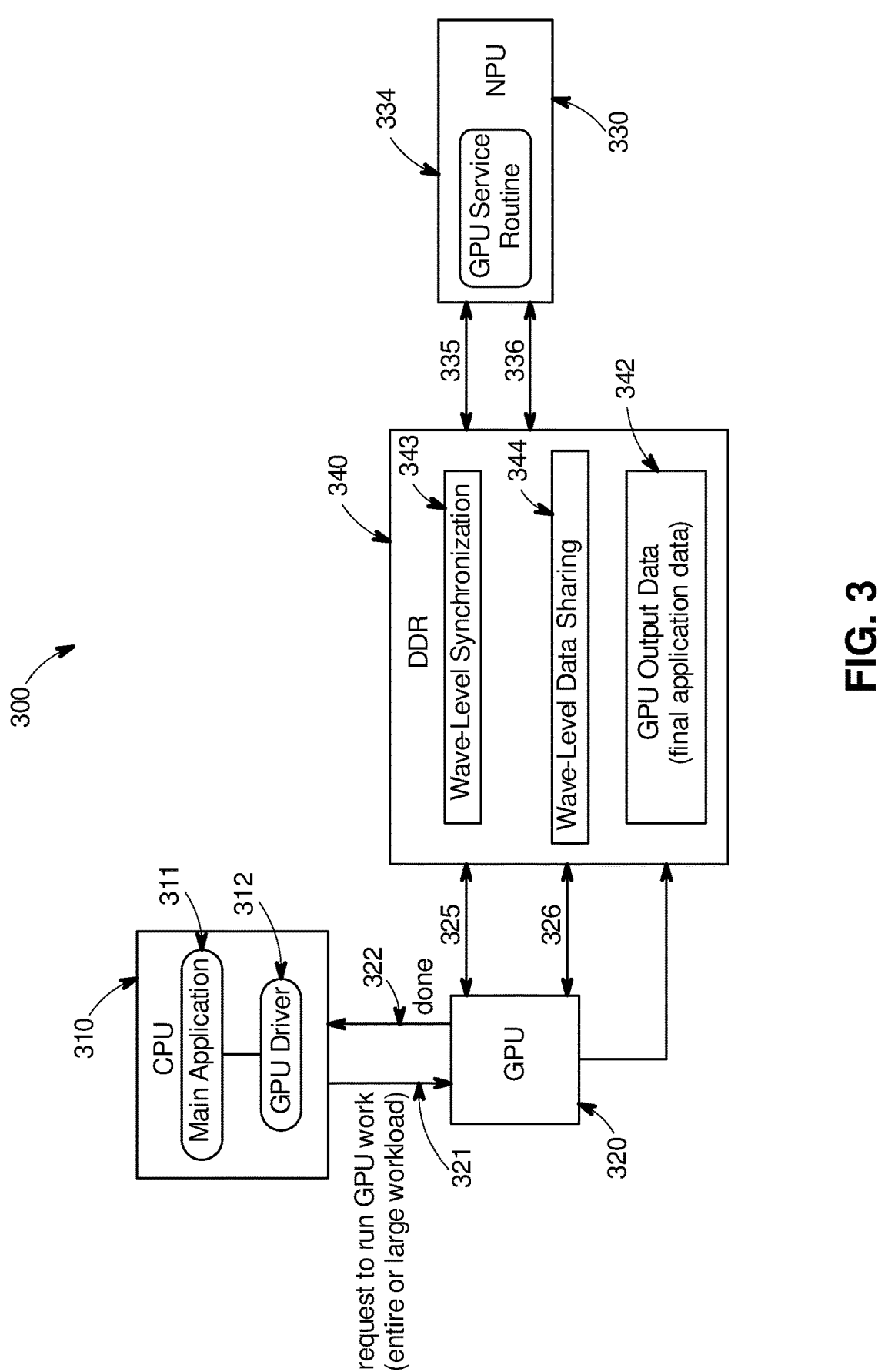
FIG. 3 illustrates an example of a concurrent tensor processing system with a plurality of processing engines and a common memory unit.

FIG. 3 illustrates an example of a concurrent tensor processing system 300 with a plurality of processing engines and a common memory unit. In one example, the concurrent tensor processing system 300 includes a central processing unit (CPU) 310, a graphics processing unit (GPU) 320, a neural processing unit (NPU) 330 and a common memory unit 340. In one example, the common memory unit 340 is a double data rate (DDR) memory.

In one example, the CPU 310 includes a plurality of software modules for executing a plurality of work tasks and functions. In one example, the work tasks and functions include accessing an input tensor from the common memory unit 340 and accessing a kernel tensor from the common memory unit 340.

In one example, the CPU 310 may also assign certain work tasks and functions to other processing engines. For example, the CPU 310 may assign GPU work tasks to the GPU 320. In one example, the plurality of software modules may include a main application module 311, a GPU driver 312, etc.

In one example, the NPU 330 includes a GPU service routine module 334. In one example, the GPU service routine module 334 is a software module used to facilitate data and control exchange between two processors (e.g., between the GPU 320 and NPU 330).

In one example, the common memory unit 340 (e.g., DDR memory) may be accessed by GPU 320 and NPU 330. In one example, the common memory unit 340 stores GPU output data 342. In one example, the GPU output data 342 may be final application data. In one example, the common memory unit 340 may include a wave-level synchronization module 343 and a wave-level data sharing module 344.

In one example, the concurrent tensor processing system 300 may operate by sending coordination messages among the plurality of processing engines. In one example, the CPU 310 may send a GPU work request message 321 to the GPU 320. For example, the GPU work request message 321 may direct the GPU 320 to initiate GPU work tasks. For example, upon completion of GPU work tasks by the GPU 320, the GPU 320 may send a GPU work complete message 322 to the CPU 310. In one example, the CPU 310 configures NPU 330 to be accessed directly by the GPU 320 to support a workload or a wave-level execution structure from the GPU 320.

In one example, the GPU 320 may connect to the common memory unit 340 via a GPU synchronization interface 325 and a GPU data interface 326. In one example, the NPU 330 may connect to the common memory unit 340 via a NPU synchronization interface 335 and a NPU data interface 336.

In one example, the concurrent tensor processing system 300 achieves concurrent tensor processing with a plurality of processing engines by offloading certain work tasks using fine-grain parallelism. In one example, the NPU 330 may be accessed directly by the GPU 320 with minimal offload overhead by supporting a workload or wave-level execution structure from the GPU 320. That is, in one example, the GPU 320 may assign work tasks to the NPU 330.

In one example, the NPU 330 may execute heterogeneous offload of fine-grain (i.e., wave-level or workload-level) matrix multiplication and convolution instructions directly from the GPU 320 to the NPU 330 without control or involvement by the CPU 310. That is, in one example, the NPU 330 may execute heterogeneous operations on the input tensor and the kernel tensor.

In one example, offload means work delegation from one processing engine to another processing engine. In one example, the NPU 330 may execute heterogeneous offload instructions using wave-level parallel operations or parallel tensor processing. For example, wave-level parallel operations means operations on a plurality of fibers in parallel, i.e., using parallel processing cores. In one example, parallel tensor processing means operations are performed on a tensor simultaneously, not sequentially. In one example a portion of an input tensor comprises a plurality of input fibers. In one example, a portion of a kernel tensor comprises a plurality of kernel fibers. In one example, the wave-level parallel operations are executed on the plurality of input fibers and the plurality of kernel fibers in parallel.

In one example, the performance benefits of concurrent tensor processing may be understood by examining example workload executions. In one example, a typical processor workload may involve a tensor processing or a matrix multiplication operation which executes a first pseudocode in small groups of fibers or waves. In one example, the matrix multiplication operation multiplies a first matrix A with a second matrix B to produce an output matrix C. In one example, a matrix is a tensor with two dimensions or a second order tensor.

Figure 4:
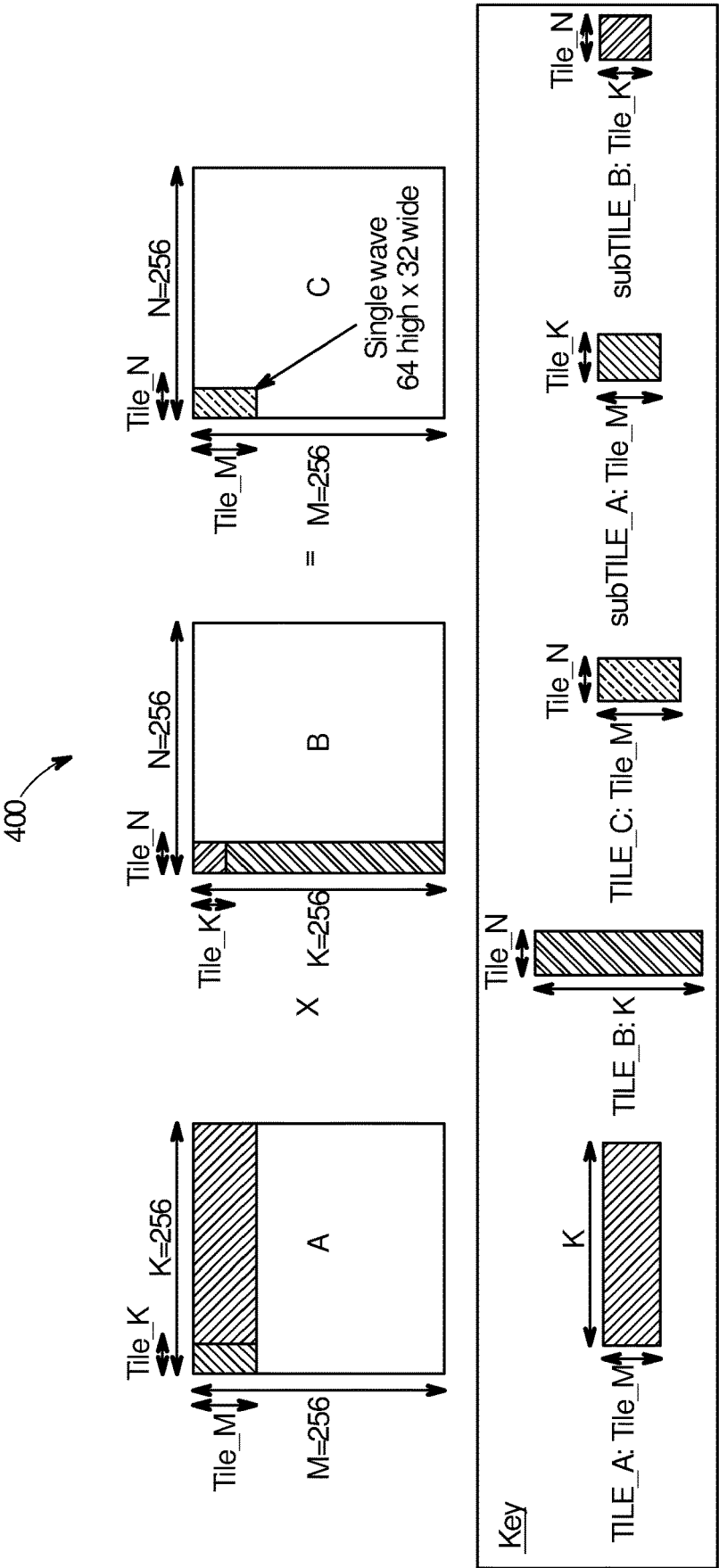
FIG. 4 illustrates an example matrix multiplication of a first matrix A and a second matrix B to produce an output matrix C.

FIG. 4 illustrates an example matrix multiplication 400 of a first matrix A and a second matrix B to produce an output matrix C. In one example, a size of a matrix is determined by a quantity of rows and a quantity of columns. In one example, the size of the first matrix A is M rows by K columns, the size of the second matrix B is K rows by N columns and the size of the output matrix C is M rows by N columns. In one example, the first matrix A may be partitioned into TILE_M rows and TILE_K columns. In one example, the second matrix B may be partitioned into TILE_K rows and TILE_N columns. In one example, the output matrix C may be partitioned into TILE_M rows and TILE_N columns. In one example, a wave may be one partition of a matrix with size corresponding to TILE_M rows by TILE_N columns. In one example, each wave may include a plurality of fibers.

In one example, each fiber in a wave operates on a localized section of the output matrix C. In one example, the first pseudocode has the following form:
1. Execute work prior to matrix multiplication
2. For each TILE_K in K (e.g., wave-level matrix multiplication by GPU)
    i. Load subTILE_A into GPU memory, size TILE_M× TILE_K
    ii. Load subTILE_B into GPU memory, size TILE_K× TILE_N
    iii. TILE_C=subTILE_A*subTILE_B, size TILE_M× TILE_N
3. Execute work subsequent to matrix multiplication In one example, with the NPU 330 available to perform certain operations for the GPU 320 (i.e., the NPU 330 may offload the GPU 320), a heterogeneous computation may be performed using a second pseudocode. In one example, the second pseudocode has the following form:
1. Execute work prior to matrix multiplication
2. Perform matrix multiplication:
    i. If first access to this TILE_A, convert TILE_A to NPU-custom format (wave-level data preparation performed by GPU)
    ii. If first access to this TILE_B, convert TILE_B to NPU-custom format (wave-level data preparation performed by GPU)
    iii. Send wave-size work request from GPU to NPU (matrix multiplication performed by NPU)
    iv. Wait for work complete response message from NPU for this wave
3. Execute work subsequent to matrix multiplication.

In one example, for the second pseudocode, a software loop over index K in steps of TILE_K has been removed and a larger work request for matrix multiplication has been created. In one example, for the second pseudocode, the GPU maintains TILE_M and TILE_N unchanged which avoids increasing overall size of the wave-level parallel operations. In one example, conversion of data to an NPU-custom format may be added to GPU execution, once per TILE_A group and once per TILE_B group, while each of these tiles is used multiple times for computing various TILE_C groups. In one example, the GPU executes data conversion in parallel for unique tiles of matrix A and matrix B, effectively using its vector processing capabilities.

In one example, upon receiving each wave-level work request, the NPU first loads relevant pre-computed TILE_A group and TILE_B group into its local memory, typically larger than memory available for each wave on the GPU. In one example, the cached instances of portions of matrix A and matrix B are re-used as necessary for later computation of different TILE_C groups.

In one example, synchronization of a request/response message protocol may be performed by using two shared buffer memories, a first buffer memory written by the GPU and read or polled by the NPU and a second buffer memory written by the NPU and read or polled by the GPU. In one example, each wave occupies a single slot in the shared buffer memories. In one example, a GPU wave sets its request buffer memory slot to a request identifier value (e.g., which is incrementing). In one example, a NPU sets its response buffer memory slot to the request identifier value.

Figure 5:
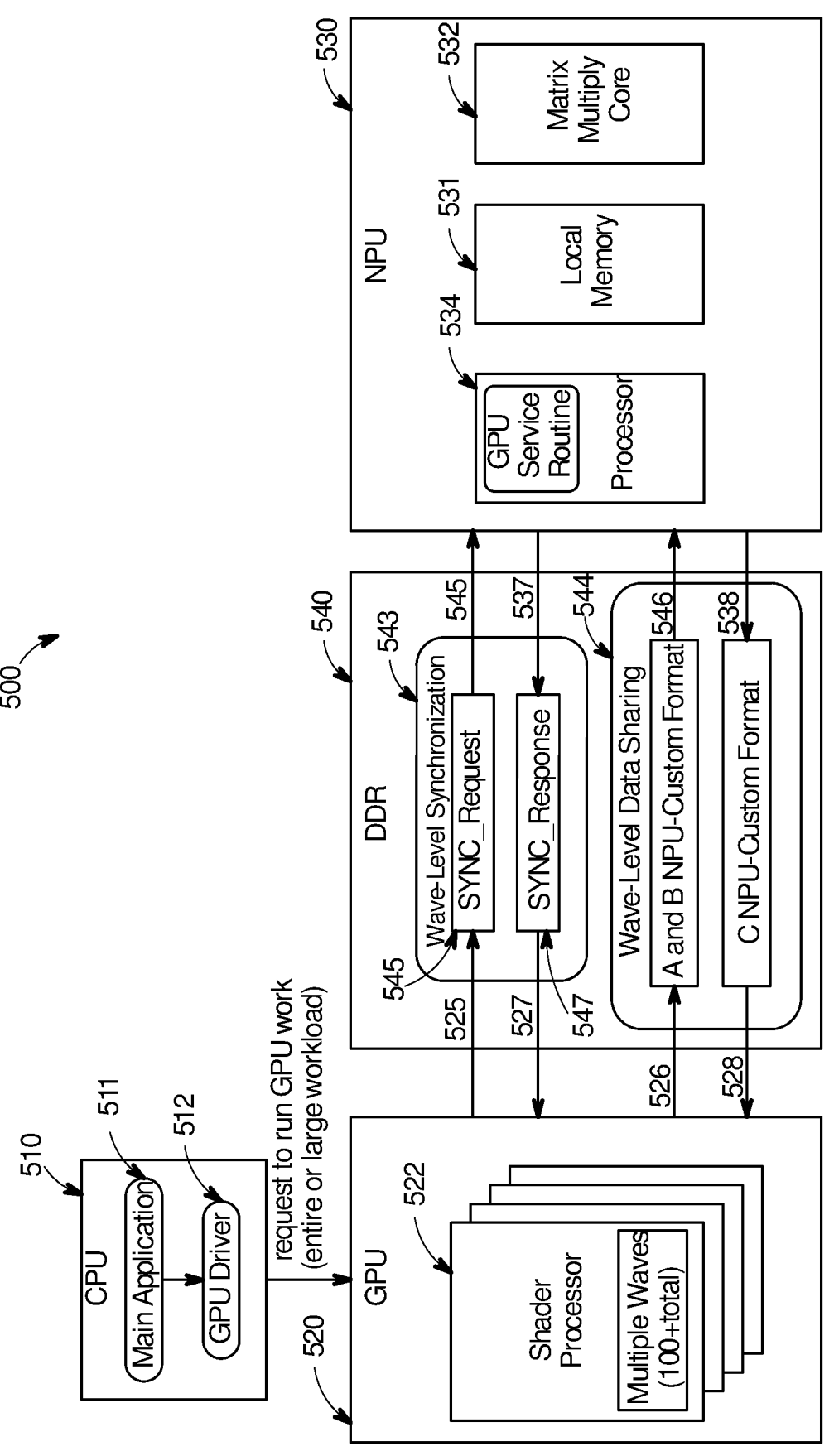
FIG. 5 illustrates an example concurrent tensor processing system with detailed subsystems with a plurality of processing engines and a common memory unit.

FIG. 5 illustrates an example concurrent tensor processing system with detailed subsystems 500 with a plurality of processing engines and a common memory unit. In one example, the concurrent tensor processing system with detailed subsystems 500 includes a central processing unit (CPU) 510, a graphics processing unit (GPU) 520, a neural processing unit (NPU) 530 and a common memory unit 540. In one example, the common memory unit 540 is a double data rate (DDR) memory. In one example, the common memory unit 540 is a shared data repository for the GPU 520 and the NPU 530. In one example, the NPU 530 is a tensor processor. In one example, the tensor processor operates on an array of tensor elements with a plurality of dimensions. In one example, the tensor processor operates on a subset of a such as a fiber or a wave. In one example, the fiber is a first subset of the tensor with all indices but one fixed. That is, for the fiber, if there are N indices, N−1 are fixed. For example, the fiber may be a subset of the tensor with tensor elements $\{x_{ijk}\}$ where indices j and k are fixed but index i is variable. In one example, the wave is a second subset of the tensor with tensor elements $\{x_{ijk}\}$ where two or more indices are variable. That is, for the wave, if there are N indices, N−2 or less are fixed. That is, the wave may be considered as a group of fibers.

In one example, the CPU 510 includes a plurality of software modules for executing a plurality of work tasks and functions. In one example, the CPU 510 may also assign certain work tasks and functions to other processing engines. For example, the CPU 510 may assign GPU work tasks to the GPU 520. In one example, the plurality of software modules may include a main application module 511, a GPU driver 512, etc.

In one example, the plurality of work tasks may include matrix multiplication, convolution, correlation, etc. In one example, the GPU 520 includes a plurality of shader processors 522. In one example, the plurality of shader processors 522 may process a plurality of waves (e.g., a quantity of more than 100 waves). In one example, the NPU 530 includes a service processor 534 including a GPU service routine, a local memory 531 and a matrix multiplication core processor 532 (a.k.a., matrix multiply core 532). In one example, the GPU service routine is a software module used to facilitate data and control exchange between two processors (e.g., between the GPU 520 and NPU 530).

In one example, the common memory unit 540 (e.g., DDR memory) may be accessed by GPU 520 and NPU 530. In one example, the common memory unit 540 may include a wave-level synchronization module 543 and a wave-level data sharing module 544. In one example, the wave-level synchronization module 543 may include a synchronization request message 545 and a synchronization response message (which is a NPU synchronization response message 537). In one example, the wave-level data sharing module 544 may include a GPU output data in an NPU-custom format 546 and NPU output data 538 (which is in the NPU-custom format). In one example, the NPU-custom format is a tensor-custom format. In one example, the tensor-custom format is a format optimized for representing and executing a tensor.

In one example, the common memory unit 540 may interface with GPU 520 for synchronization functions with a GPU synchronization request message 525 and a GPU synchronization response message 527, for example, with the wave-level synchronization module 543. In one example, the common memory unit 540 may interface with GPU 520 for data sharing functions with a GPU output data 526 and a GPU input data 528, for example, with the wave-level data sharing module 544. In one example, the wave-level data sharing module 544 stores data in NPU-custom format to facilitate data exchange between the GPU 520 and the NPU 530.

In one example, the common memory unit 540 may interface with the NPU 530 for synchronization functions using a NPU synchronization request message (which is the synchronization request message 545) and the NPU synchronization response message 537, for example, with the wave-level synchronization module 543. In one example, the common memory unit 540 may interface with NPU 530 for data sharing functions using a NPU input data (which is the GPU output data in an NPU-custom format 546) and the NPU output data 538 (which is in the NPU-custom format), for example, with the wave-level data sharing module 544.

In one example, the synchronization request message 545 and a synchronization response message (which is the NPU synchronization response message 537) may be based on a polling synchronization scheme. In one example, the synchronization request message 545 and the synchronization response message (which is the NPU synchronization response message 537) may be based on a hardware interrupt synchronization scheme.

Figure 6:
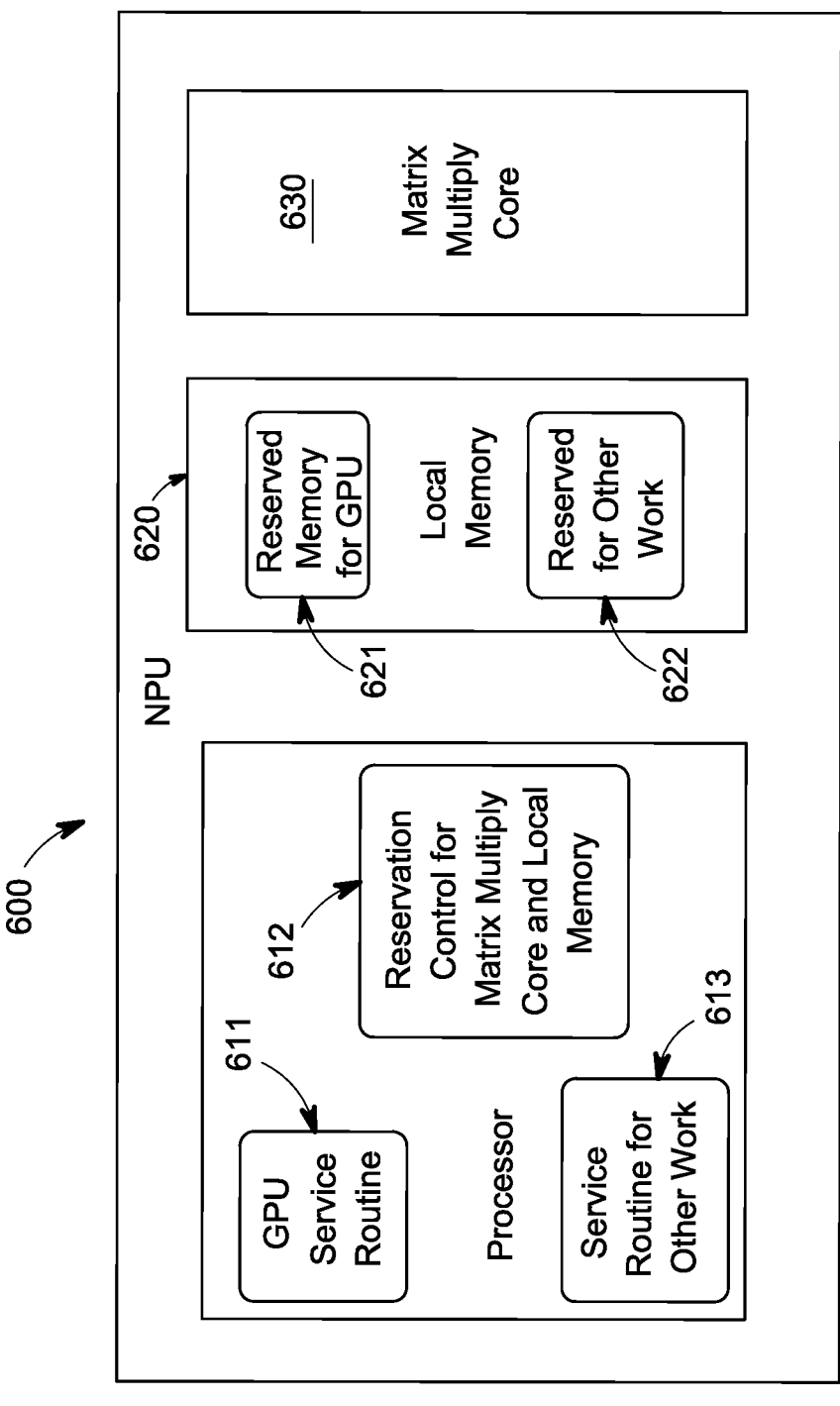
FIG. 6 illustrates an example neural processing unit (NPU).

FIG. 6 illustrates an example neural processing unit (NPU) 600. In one example, the NPU 600 includes an NPU processor 610, an NPU local memory 620 and a matrix multiplication core processor 630 (a.k.a., matrix multiply core 630). In one example, the NPU processor 610 includes a GPU service routine 611, a reservation controller 612 and a service routine 613. In one example, the GPU service routine 611 handles work requests from the GPU. In one example, the reservation controller 612 manages access for a matrix multiplication operation and for NPU local memory 620. In one example, the service routine 613 handles tasks for other work.

In one example, the NPU local memory 620 includes GPU reserved memory space 621 and other reserved memory space 622 (a,k,a., Reserved for Other Work 622). In one example, the matrix multiplication core processor 630 is used for matrix multiplication operations. In one example, GPU offload work tasks may be interleaved with other NPU work tasks by partitioning available memory and by locking the matrix multiplication core processor 630 during active use by each process.

Figure 7:
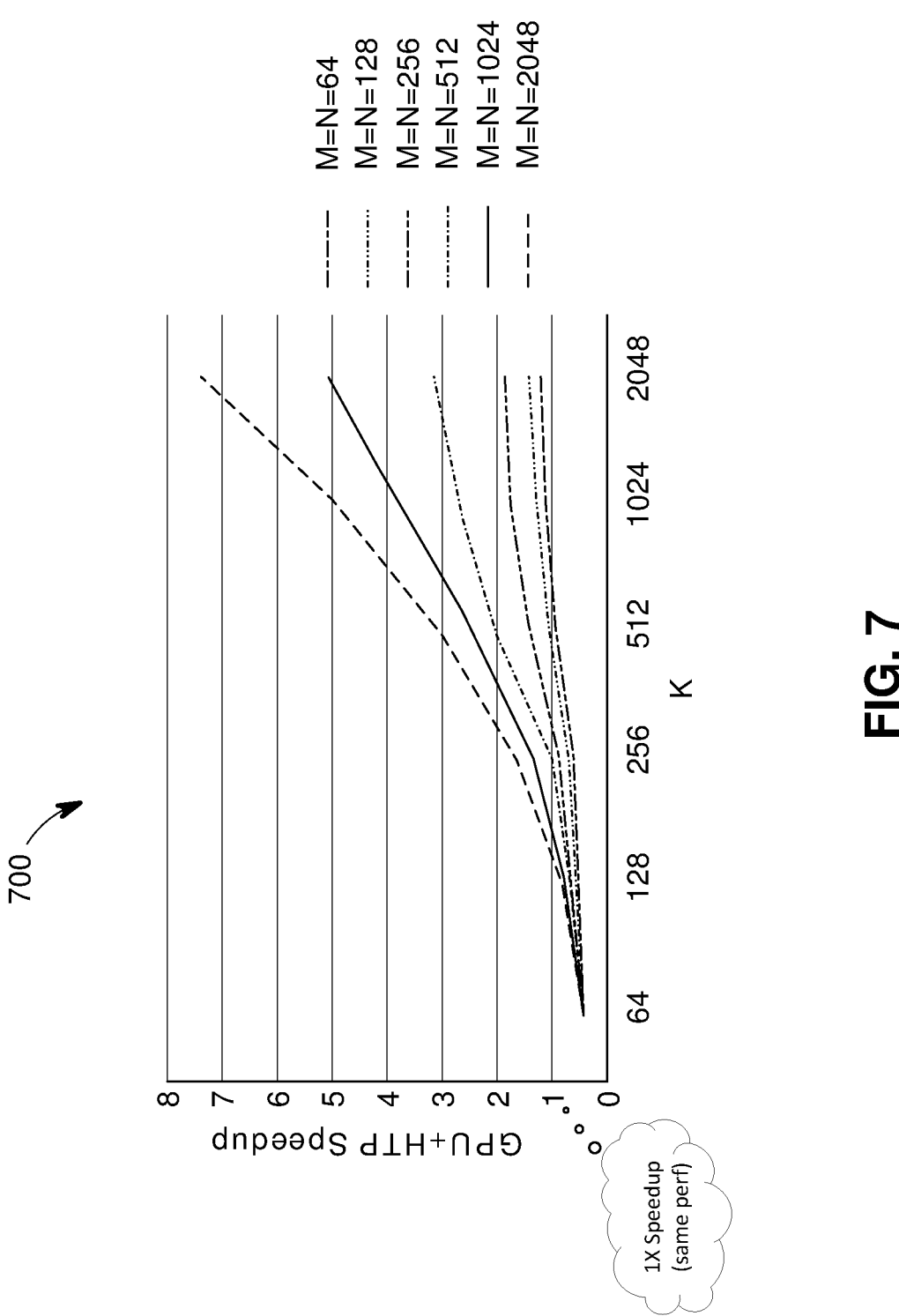
FIG. 7 illustrates an example graph of relative performance improvement for a concurrent tensor processing system in terms of work completion speedup factor.

FIG. 7 illustrates an example graph 700 of relative performance improvement for a concurrent tensor processing system in terms of work completion speedup factor. In one example, the horizontal axis of the graph of FIG. 7 is a matrix row quantity K, and the vertical axis is a relative speedup factor normalized to a condition where the concurrent tensor processing system performs the same as a non-concurrent tensor processing system. In one example, the graph of FIG. 7 shows relative performance improvement for a plurality of output matrix size M by N.

FIG. 8 illustrates an example flow diagram 800 for executing concurrent tensor processing. In block 810, a first portion of an input tensor is accessed from a common memory unit. In one example, the input tensor is an input matrix. In one example, the input tensor is part of a work task. In one example, the work task is tensor processing. In one example, the work task may include matrix multiplication, convolution, correlation, etc. In one example, the input matrix has size M rows by K columns. In one example, the input matrix may be partitioned into TILE_M rows and TILE_K columns, where TILE_M is less than M and TILE_K is less than K.

In block 820, a first portion of a kernel tensor is accessed from the common memory unit. In one example, the kernel tensor is a kernel matrix. In one example, the kernel tensor is part of a work task. In one example, the work task is tensor processing. In one example, the work task may include matrix multiplication, convolution, correlation, etc. In one example, the kernel matrix has size K rows by N columns. In one example, the kernel matrix may be partitioned into TILE_K rows and TILE_N columns, where TILE_K is less than K and TILE_N is less than N.

In block 830, the first portion of the input tensor is sent to a neural processing unit (NPU). In one example, the NPU performs wave-level tensor processing using the first portion of the input tensor.

In block 840, the first portion of the kernel tensor is sent to the NPU. In one example, the NPU performs wave-level tensor processing using the first portion of the kernel tensor.

In block 850, a synchronization request message is sent to the NPU. In one example, the synchronization request message may be based on a polling synchronization scheme. In one example, the synchronization request message may be based on a hardware interrupt synchronization scheme.

In block 860, a synchronization response message is received from the NPU. In one example, the synchronization response message may be based on a polling synchronization scheme. In one example, the synchronization response message may be based on a hardware interrupt synchronization scheme.

In block 870, a first portion of an output tensor is retrieved from the common memory unit, wherein the first portion of the output tensor is generated by the NPU based on the first portion of the input tensor and on the first portion of the kernel tensor. In one example, the output tensor is part of a work task. In one example, the work task is tensor processing. In one example, the work task may include matrix multiplication, convolution, correlation, etc. In one example, the output matrix has size M rows by N columns. In one example, the output matrix may be partitioned into TILE_M rows and TILE_N columns, where TILE_M is less than M and TILE_N is less than N. In one example, a wave may be one partition of the output matrix with size corresponding to TILE_M rows by TILE_N columns. In one example, each wave may include a plurality of fibers. In one example, the NPU performs wave-level tensor processing to generate the first portion of the output tensor.

In one example, the steps of FIG. 8 may be repeated with another portion of the input tensor from the common memory unit and another portion of the kernel tensor from the common memory unit. In one example, the another portion is a second portion, a third portion, a fourth portion all the way through a Qth portion.

In one aspect, one or more of the steps in FIG. 8 may be executed by one or more processors which may include hardware, software, firmware, etc. The one or more processors, for example, may be used to execute software or firmware needed to perform the steps in the flow diagram of FIG. 8. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

The software may reside on a computer-readable medium. The computer-readable medium may be a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The computer-readable medium may also include, by way of example, a carrier wave, a transmission line, and any other suitable medium for transmitting software and/or instructions that may be accessed and read by a computer. The computer-readable medium may reside in a processing system, external to the processing system, or distributed across multiple entities including the processing system. The computer-readable medium may be embodied in a computer program product. By way of example, a computer program product may include a computer-readable medium in packaging materials. The computer-readable medium may include software or firmware. Those skilled in the art will recognize how best to implement the described functionality presented throughout this disclosure depending on the particular application and the overall design constraints imposed on the overall system.

Any circuitry included in the processor(s) is merely provided as an example, and other means for carrying out the described functions may be included within various aspects of the present disclosure, including but not limited to the instructions stored in the computer-readable medium, or any other suitable apparatus or means described herein, and utilizing, for example, the processes and/or algorithms described herein in relation to the example flow diagram.

Within the present disclosure, the word "exemplary" is used to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage or mode of operation. The term "coupled" is used herein to refer to the direct or indirect coupling between two objects. For example, if object A physically touches object B, and object B touches object C, then objects A and C may still be considered coupled to one another-even if they do not directly physically touch each other. The terms "circuit" and "circuitry" are used broadly, and intended to include both hardware implementations of electrical devices and conductors that, when connected and configured, enable the performance of the functions described in the present disclosure, without limitation as to the type of electronic circuits, as well as software implementations of information and instructions that, when executed by a processor, enable the performance of the functions described in the present disclosure.

One or more of the components, steps, features and/or functions illustrated in the figures may be rearranged and/or combined into a single component, step, feature or function or embodied in several components, steps, or functions. Additional elements, components, steps, and/or functions may also be added without departing from novel features disclosed herein. The apparatus, devices, and/or components illustrated in the figures may be configured to perform one or more of the methods, features, or steps described herein. The novel algorithms described herein may also be efficiently implemented in software and/or embedded in hardware.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for."

One skilled in the art would understand that various features of different embodiments may be combined or modified and still be within the spirit and scope of the present disclosure.

What is claimed is:

1. An apparatus comprising:
a common memory unit;
a first processing engine coupled to the common memory unit, wherein the first processing engine is configured to access a plurality of input fibers of an input tensor and a plurality of kernel fibers of a kernel tensor from the common memory unit; and
a second processing engine coupled to the common memory unit, wherein the first processing engine is further configured to send the plurality of input fibers of the input tensor and the plurality of kernel fibers of the kernel tensor to the second processing engine and wherein the second processing engine is configured to generate a plurality of output fibers of an output tensor based on the plurality of input fibers of the input tensor and on the plurality of kernel fibers of the kernel tensor, wherein the plurality of input fibers, the plurality of kernel fibers and the plurality of output fibers each have a single variable dimensional index; and wherein each of the plurality of input fibers is a subset of the input tensor with all indices but one fixed, wherein each of the plurality of kernel fibers is a subset of the kernel tensor with all indices but one fixed, and wherein each of the plurality of output fibers is a subset of the output tensor with all indices but one fixed.

2. The apparatus of claim 1, wherein the second processing engine is further configured to be accessed directly by the first processing engine to support a workload or a wave-level execution structure from the first processing engine.

3. The apparatus of claim 2, wherein the workload is a sum of all work tasks of the first processing engine.

4. The apparatus of claim 2, wherein the wave-level execution structure is a data structure which operates on the plurality of input fibers of the input tensor.

5. The apparatus of claim 2, wherein the wave-level execution structure is a data structure which operates on the plurality of kernel fibers of the kernel tensor.

6. The apparatus of claim 5, wherein the wave-level execution structure is the data structure which operates on the plurality of input fibers of the input tensor.

7. The apparatus of claim 1, wherein the second processing engine is further configured to execute one or more heterogeneous operations on the plurality of input fibers of the input tensor and the plurality of kernel fibers of the kernel tensor.

8. The apparatus of claim 7, wherein the one or more heterogeneous operations include matrix multiplication instructions received from the first processing engine.

9. The apparatus of claim 7, wherein the one or more heterogeneous operations include convolution instructions received from the first processing engine.

10. The apparatus of claim 7, wherein the one or more heterogeneous operations uses parallel tensor processing.

11. The apparatus of claim 10, wherein the one or more heterogeneous operations uses at least one wave-level parallel operation.

12. The apparatus of claim 11, wherein the at least one wave-level parallel operation executes on the plurality of input fibers and the plurality of kernel fibers in parallel.

13. The apparatus of claim 11, wherein the plurality of input fibers of the input tensor comprises an input wave.

14. The apparatus of claim 13, wherein the plurality of kernel fibers of the kernel tensor comprises a kernel wave.

15. The apparatus of claim 14, wherein the at least one wave-level parallel operation executes on the input wave and the kernel wave in parallel.

16. A method for implementing concurrent tensor processing, the method comprising:

accessing a plurality of input fibers of an input tensor from a common memory unit;

accessing a plurality of kernel fibers of a kernel tensor from the common memory unit;

sending the plurality of input fibers of the input tensor to a neural processing unit (NPU);

sending the plurality of kernel fibers of the kernel tensor to the NPU; and retrieving a plurality of output fibers of an output tensor from the common memory unit, wherein the plurality of output fibers of the output tensor is generated by the NPU based on the plurality of input fibers of the input tensor and on the plurality of kernel fibers of the kernel tensor, wherein the plurality of input fibers, the plurality of kernel fibers and the plurality of output fibers each have a single variable dimensional index; and wherein each of the plurality of input fibers is a subset of the input tensor with all indices but one fixed, wherein each of the plurality of kernel fibers is a subset of the kernel tensor with all indices but one fixed, and wherein each of the plurality of output fibers is a subset of the output tensor with all indices but one fixed.

17. The method of claim 16, further comprising sending a synchronization request message to the NPU.

18. The method of claim 17, wherein the synchronization request message is based on a polling synchronization scheme or on a hardware interrupt synchronization scheme.

19. The method of claim 17, further comprising receiving a synchronization response message from the NPU.

20. The method of claim 19, wherein the synchronization response message is based on a polling synchronization scheme or on a hardware interrupt synchronization scheme.

21. The method of claim 16, further comprising configuring the NPU to be accessed directly by a processing engine to support a workload or a wave-level execution structure from the processing engine.

22. The method of claim 16, wherein the plurality of input fibers of the input tensor comprises a plurality of input waves and the plurality of kernel fibers of the kernel tensor comprises a plurality of kernel waves.

23. An apparatus for implementing concurrent tensor processing, the apparatus comprising:

means for accessing a plurality of input fibers of an input tensor from a common memory unit;

means for accessing a plurality of kernel fibers of a kernel tensor from the common memory unit;

means for sending the plurality of input fibers of the input tensor to a neural processing unit (NPU);

means for sending the plurality of kernel fibers of the kernel tensor to the NPU; and means for retrieving a plurality of output fibers of an output tensor from the common memory unit, wherein the plurality of output fibers of the output tensor is generated by the NPU based on the plurality of input fibers of the input tensor and on the plurality of kernel fibers of the kernel tensor, wherein the plurality of input fibers, the plurality of kernel fibers and the plurality of output fibers each have a single variable dimensional index; and wherein each of the plurality of input fibers is a subset of the input tensor with all indices but one fixed, wherein each of the plurality of kernel fibers is a subset of the kernel tensor with all indices but one fixed, and wherein each of the plurality of output fibers is a subset of the output tensor with all indices but one fixed.

24. The apparatus of claim 23, further comprising means for configuring the NPU to be accessed directly by a processing engine to support a workload or a wave-level execution structure from the processing engine.

25. A non-transitory computer-readable medium storing computer executable code, operable on a device comprising at least one processor and at least one memory coupled to the at least one processor, wherein the at least one processor is configured to implement concurrent tensor processing, the computer executable code comprising:

instructions for causing a computer to access a plurality of input fibers of an input tensor from a common memory unit;

instructions for causing the computer to access a plurality of kernel fibers of a kernel tensor from the common memory unit;

instructions for causing the computer to send the plurality of input fibers of the input tensor to a neural processing unit (NPU);

instructions for causing the computer to send the plurality of kernel fibers of the kernel tensor to the NPU; and instructions for causing the computer to retrieve a plurality of output fibers of an output tensor from the common memory unit, wherein the plurality of output fibers of the output tensor is generated by the NPU based on the plurality of input fibers of the input tensor and on the plurality of kernel fibers of the kernel tensor, wherein the plurality of input fibers, the plurality of kernel fibers and the plurality of output fibers each have a single variable dimensional index; and wherein each of the plurality of input fibers is a subset of the input tensor with all indices but one fixed, wherein each of the plurality of kernel fibers is a subset of the kernel tensor with all indices but one fixed, and wherein each of the plurality of output fibers is a subset of the output tensor with all indices but one fixed.

26. The non-transitory computer-readable medium of claim 25, further comprising instructions for causing the computer to configure the NPU to be accessed directly by a processing engine to support a workload or a wave-level execution structure from the processing engine.

* * * * *